United States Patent [19]

Kaneko et al.

[11] Patent Number: 4,805,041
[45] Date of Patent: Feb. 14, 1989

[54] ELECTRON BEAM RECORDER

[75] Inventors: Shinji Kaneko; Masahide Mitsuoka, both of Kanagawa, Japan

[73] Assignee: Sony Corporation, Tokyo, Japan

[21] Appl. No.: 64,554

[22] Filed: Jun. 22, 1987

[30] Foreign Application Priority Data

Jul. 10, 1986 [JP] Japan ............................. 61-160821

[51] Int. Cl.⁴ .............................................. H04N 5/76
[52] U.S. Cl. .................................................. 358/347
[58] Field of Search ............... 358/335, 347, 296, 302, 358/166, 168, 182, 160, 244; 369/101

[56] References Cited

U.S. PATENT DOCUMENTS 3,873,767 3/1975 Okada et al. .................. 358/168
4,663,667 5/1987 Shenk ............................ 358/168

Primary Examiner—Donald McElheny, Jr.
Attorney, Agent, or Firm—Hill, Van Santen, Steadman & Simpson

[57] ABSTRACT

In an electron beam recorder for recording pictures on a sensitive medium by scanning the sensitive medium with an electron beam, the electron beam recorder is disclosed which includes in the signal supplying circuit thereof a contrast compensating circuit consisting of delay means for providing the picture signal to be recorded with predetermined delay times and a non-adder-mixer for combining the signals obtained from the delay means with the original picture signal, wherein the exposure period by the electron beam is controlled to be shortened by means of the contrast compensating circuit.

4 Claims, 4 Drawing Sheets

ELECTRON BEAM RECORDER

BACKGROUND OF THE INVENTION

The present invention relates to an electron beam recorder having incorporated therein a contrast compensating circuit capable of providing the picture signal to be supplied to an electron beam recorder with a pre-distortion whereby contrast in the picture on a film or the like is improved.

In a film recorder such as to produce a movie film from a video signal, it is a general practice that the video signal is first recorded in a VTR or the like and then subjected to editing operation and the thus edited picture signal is supplied to the film recorder while being reproduced at the speed corresponding to the processing time of the recorder.

As the stylus (pen point) for exposing the film, those using a CRT spot, laser beam, electron beam, etc. are known, of which the recorder using the electron beam (EBR) is specifically suitable for high resolution monochromatic recording. In such a recorder, as shown in FIG. 5, for example, a film 11 disposed in a vacuum device 10 from which air is exhausted is directly exposed to an electron beam 13 emitted from an electron gun 12 while the electron beam 13 is caused to scan the film by means of a deflection device 14, and thereby, a master movie flim is produced.

The electron beam 13 is made into a fine beam spot by a converging lens or the like and modulated by the picture signal $S_v$ and thereby pictures are recorded on the film 11 in one frame after another.

The density distribution of the electron beam, however, is microscopically represented by a curve having a certain degree of spread as shown in FIG. 6. Therefore, there has been a problem that, as the electric current density becomes higher, the frequency characteristic of the film is deteriorated by this spread present in the curve, and the contrast in the picture is thereby lowered.

More particularly, when a picture signal $S_v$ consisting of white and black levels formed of a high frequency component as indicated in FIG. 7(a) is supplied, the bases of the spread electron beam on account of the above described spreading overlap each other, as indicated in FIG. 7(b), in the regions of valleys $t_1$, $t_2$ which should originally be reproduced white, whereby exposure of the film takes place even at these portions. As the result, as indicated in FIG. 7(c), the white portions is reproduced in substantially gray color and the original contrast $C_r$ is reduced to the lower contrast $C_r'$.

Therefore, even if a picture signal A of a wide frequency band as indicated in FIG. 8 is supplied, the frequency characteristic for the picture reproduced on the film is deteriorated as indicated by the frequency band labeled F, and as a result the resolution of the picture becomes inferior.

Accordingly, the present invention was made with the object to provide an electron beam recorder having incorporated therein a contrast compensating circuit whereby the disadvantages of conventional recorders would be reduced and a picture with high resolution would be obtained.

SUMMARY OF THE INVENTION

In an electron beam recorder enabled to record a video image on a sensitive medium such as a film by exposing the same to an electron beam, the electron beam recorder according to the present invention comprises, in its circuit for supplying the signal to be recorded, delay means for delaying the signal and a non-adder-mixer for combining the delayed signals with the original signal, wherein the electron beam is modulated by the above mentioned combined signal so that the exposure time of the film by the electron beam may be restricted specifically in the high-frequency components of the signal and thereby the contrast in the picture recorded on the film is prevented from being lowered.

DETAILED DESCRIPTION OF THE PREFERRED EMBODIMENTS

Figure 1:
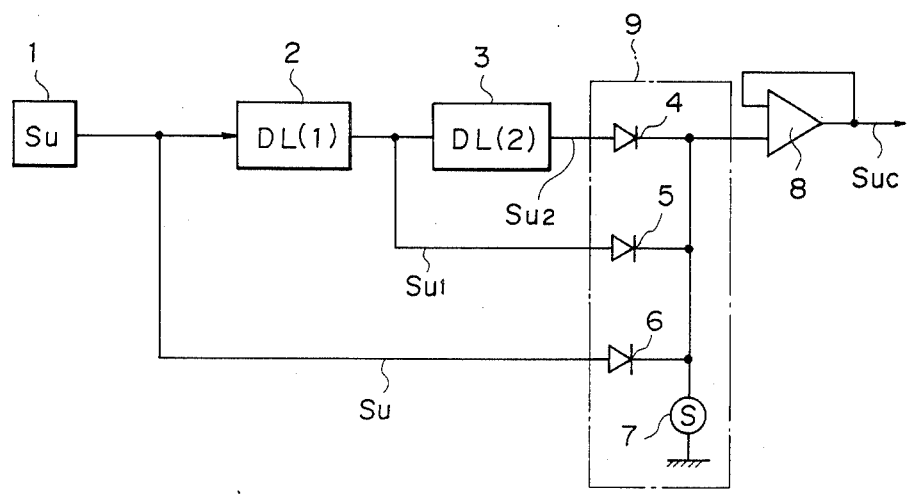
FIG. 1 is a fundamental block diagram of the present invention.

FIG. 1 shows a basic block diagram of a contrast compensating circuit for use in the electron beam recorder of the present invention, wherein reference numeral 1 denotes a signal source of the picture to be recorded, 2 and 3 denote delay circuits each providing a delay time of t, 4, 5, and 6 denote diodes forming an mixer circuit 9 for adding signals, 7 denotes a electric current source, and 8 denotes an output buffer circuit.

Figure 2:
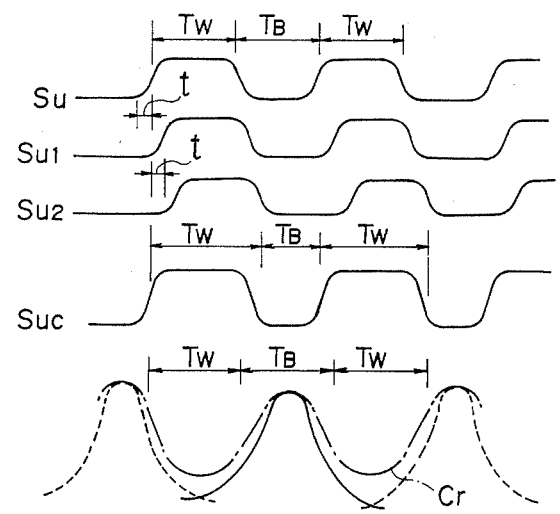
FIG. 2 is a waveform diagram in compensating operation.

A picture signal $S_v$ output from the picture signal source 1 is delayed by a time period of t by each of the two delay circuits 2 and 3 to be made into a first and second delayed signals $S_{v1}$ and $S_{v2}$ as shown in FIG. 2, and the same are then added to the original picture signal $S_v$ through the diodes 4 and 5. As the result, an added picture signal $S_{vc}$ at a predetermined level is output through the output buffer circuit 8.

In the added picture signal $S_{vc}$, as shown in FIG. 2 while the period of time $T_W$ of the white portion at the high level is expanded, the period of time of the black portion $T_B$ at the low level is shrunk in proportion to that expansion.

Therefore, the exposure time by the electron beam in the electron beam recorder modulated by the added picture signal $S_{vc}$ is made shorter than that to be modulated by the original picture signal $S_v$, whereby the overlap of the bases of the spread electron beam is reduced and the valley is deepened as indicated by the one-dot chain line $C_r$. Thus, the contrast is increased over that obtainable in the conventional recorder, according as the valley is deepened, and as a result the resolution is improved.

Figure 3:
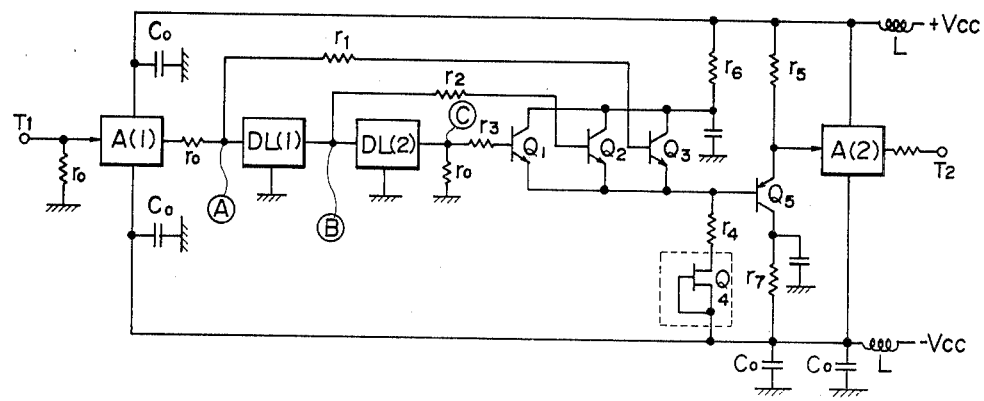
FIG. 3 is a circuit diagram of an embodiment of the present invention.

FIG. 3 shows another embodiment of the contrast compensating circuit for use in the electron beam recorder of the present invention, wherein $T_1$ denotes an input terminal, A(1) denotes a high-frequency amplifier, DL(1) and DL(2) denote delays circuits providing a delay time of t, $Q_1$, $Q_2$, and $Q_3$ denote transistors connected in emitter-follower configuration, $Q_4$ denotes an electric current source transistor, $Q_5$ denotes a transistor connected in emitter-follower configuration for adding the outputs of the transistors $Q_1$, $Q_2$, and $Q_3$, A(2) denotes an output buffer circuit, and $T_2$ denotes an output terminal.

Further, $r_0$ denote matching resistors, $r_1$, $r_2$, and $r_3$ denote base resistors, $r_6$ and $r_7$ denote collector resistors, and $C_0$ denote bypass capacitors.

In the present circuit, the original signal at point (A) and the delayed signals at points (B) and (C) are added by the transistor $Q_5$ as shown in the waveform diagram in the above described FIG. 2 so that the compensation may be provided to shorten the time period for the black level.

The delay time t of the delay circuits DL(1) and DL(2) is established based on such factors as spreading of the electron beam and the maximum frequency $f_{max}$ of the picture signal. In the case of recording a high-definition video signal, for example, it may be set to 20 nS or thereabout.

While the delay circuits are constructed by an electronic phase delay circuit, such as a delay line, BBD device can also be employed.

Figure 4:
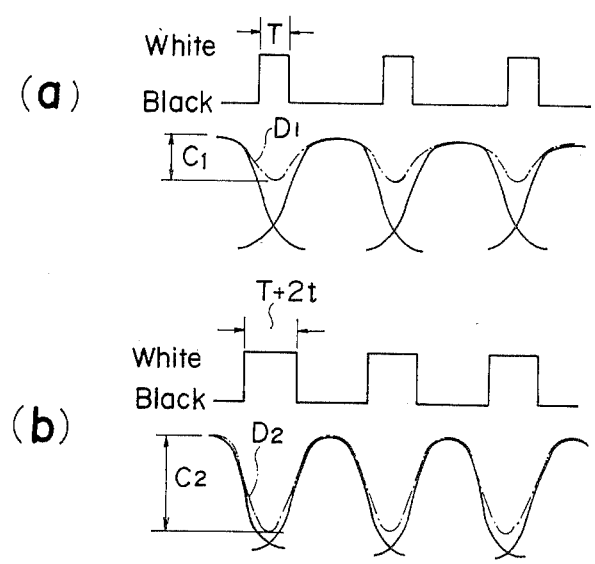
FIGS. 4(a) and 4(b) are explanatory drawings of compensating operations.
Figure 5:
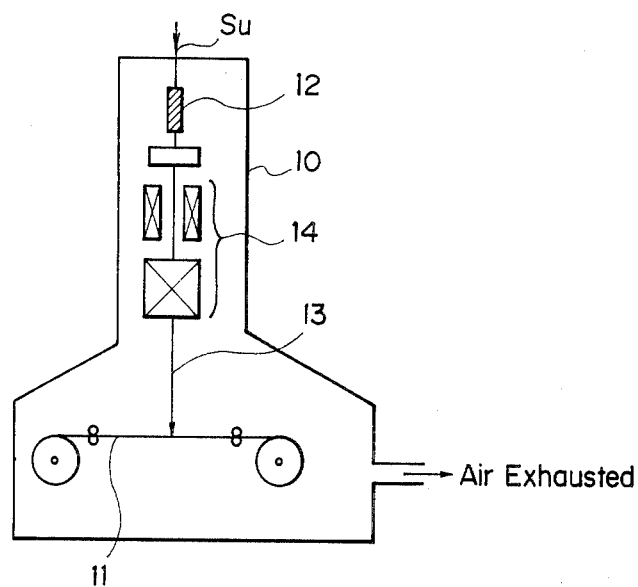
FIG. 5 is a schematic diagram of an EBR.
Figure 6:
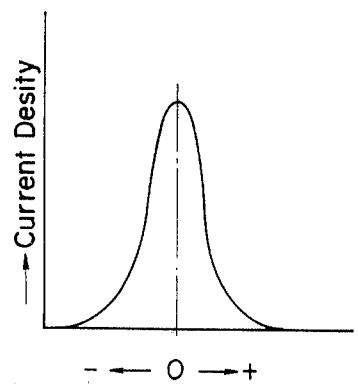
FIG. 6 is a graph indicating a spread of an electron beam.
Figure 7:
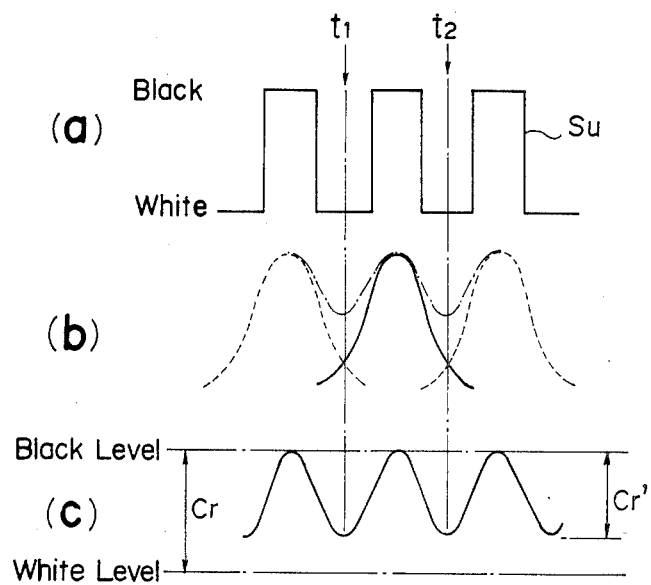
FIGS. 7(a), 7(b) and 7(c) are explanatory drawings of changed contrast.
Figure 8:
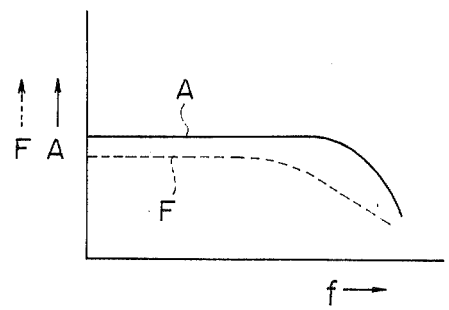
FIG. 8 is a graph indicating a frequency characteristic.

Since the contrast compensating circuit in use for this invention is constructed as described above, in the case of high-frequency signal component in which the interval between the black levels is, for example, T as shown in FIG. 4(a), although, in conventional recording, the light and shade in the picture on the film was as indicated by the one-dot chain line $D_1$ of which contrast is represented by $C_1$ on account of the spreading of the electron beam, through conversion of the picture signal according to the above described embodiment to broaden the width at both the leading and trailing edges into T+2t, the light and shade in the picture on the film becomes as indicated by the one-dot chain line $D_2$, the contrast is improved as represented by $C_2$, and as a result the quality of the picture becomes sharper.

Since the electron beam recorder of the present invention, as described so far, includes in its circuit system for supplying the picture signal a contrast compensating circuit for shaping the waveform of the picture signal by advancing the leading edge and delaying the trailing edge by means of delay means, and as the time of exposure of the electron beam is shortened by such pre-distorted waveform, an advantage is provided that the contrast in the high-frequency signal region is not lowered in spite of a spread present in the current density distribution of the electron beam, and as a result such an effect is obtained that the resolution in the recorded picture on a film or the like is improved.

What is claimed is:

1. An electron beam recorder for forming pictures by exposing a sensitive medium to an electron beam having intensity corresponding to the amplitude level of an input video signal corresponding:

means for supplying said input video signal;

delay means for delaying said input video signal by predetermined periods of time;

mixer means for non-adder-mixing the output signals of said delay means and said input video signal; and means for supplying the output signal of said mixer means to an electron beam generator, wherein said output signal of said mixer means is said input video signal whose waveform is shaped and exposes the sensitive member such that the picture formed thereon is improved in contrast.

2. An electron beam recorder according to claim 1, wherein a portion of said electron beam having strong intensity corresponds to a black portion in the picture.

3. An electron beam recorder according to claim 2, wherein said delay means is formed of two delay devices connected in series, the outputs of both thereof being connected to said mixer means.

4. An electron beam recorder according to claim 2, wherein said mixer means is formed of a plurality of transistors arranged in common-emitter circuit configuration and a current supply source connected between the emitters in common and the ground, and wherein the bases of said plurality of transistors are respectively supplied with the input video signal and the output signals of said delay means.

* * * * *